INVENTOR.
PHILIP E. VOLZ
BY Charles H. Brown
ATTORNEY

United States Patent Office 2,714,705
Patented Aug. 2, 1955

2,714,705

ELECTRONIC PHASE SHIFTING SYSTEM

Philip Eckert Volz, Florham Park, N. J., assignor to Radio Corporation of America, a corporation of Delaware Continuation of application Serial No. 230,888, June 11, 1951. This application March 5, 1953, Serial No. 340,527

13 Claims. (Cl. 332—14)

The invention relates to phase shifting systems, and, more particularly, to a novel system for shifting the phase of a timing wave generated by a timing wave generator for local apparatus whereby it will follow an incoming signal that has no elements especially for synchronizing. The instant application is a continuation of the U. S. application Serial No. 230,888 filed June 11, 1951 copending at the time of filing the instant application and thereafter abandoned.

In accordance with the invention, a local timing wave generator, which may consist of or comprise a frequency divider, is arranged to generate a timing wave in response to applied pulses obtained from a source of reference waves. The phase of the output of the frequency divider is advanced or retarded by the injection and blanking of cycles or pulses in the input control pulse train. In one embodiment, the timing wave generator is operated in response to pulses appearing in the cathode circuit of a space discharge device. Input control pulses are applied as positive-going pulses to the anode of the space discharge device. The grid of the space discharge device is maintained at a positive potential in the absence of phase retarding correction pulses of predetermined duration. A second space discharge device is provided having the cathode connected to the cathode of the first space discharge device. The grid of the second device is connected to the grid of the first space discharge device. Positive-going phase advancing correction pulses are fed to the anode of the second space discharge device in accordance with a desired condition of operation of the timing wave generator.

An object of the present invention is to provide a novel phase shifter for maintaining local synchronization with incoming signals which do not have special synchronizing pulses.

Another object is to provide novel means for controlling a frequency divider by adding and/or omitting pulses at the control input for the frequency divider.

A further object is to provide novel means for advancing or retarding the phase of an electrical wave formation under control of correction pulses.

Figure 1:
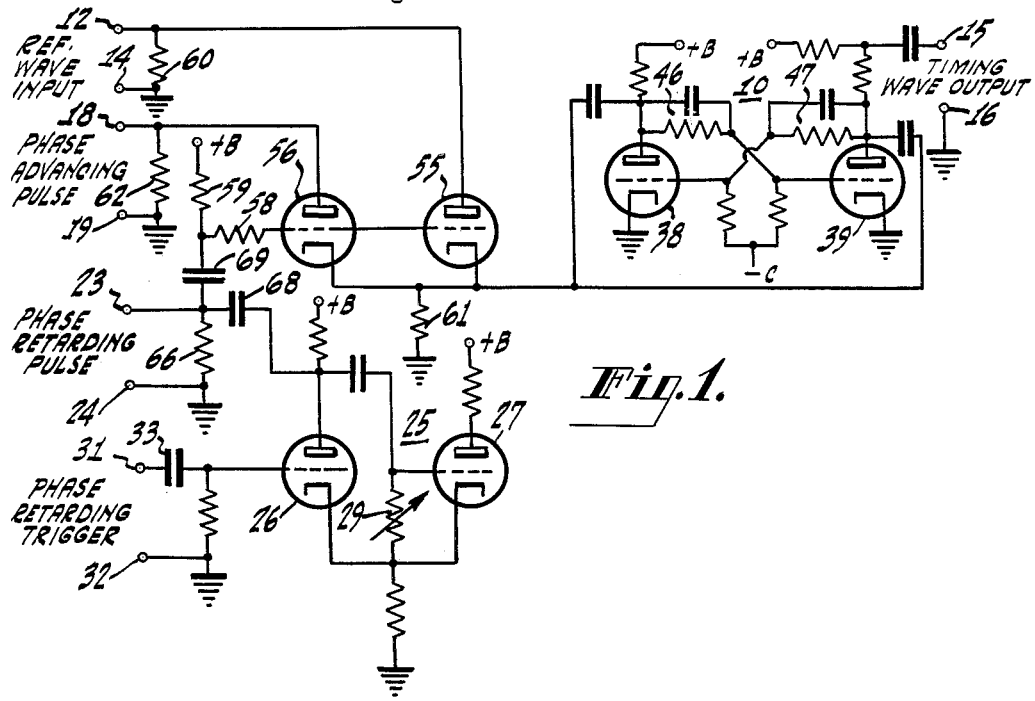
Figure 2:
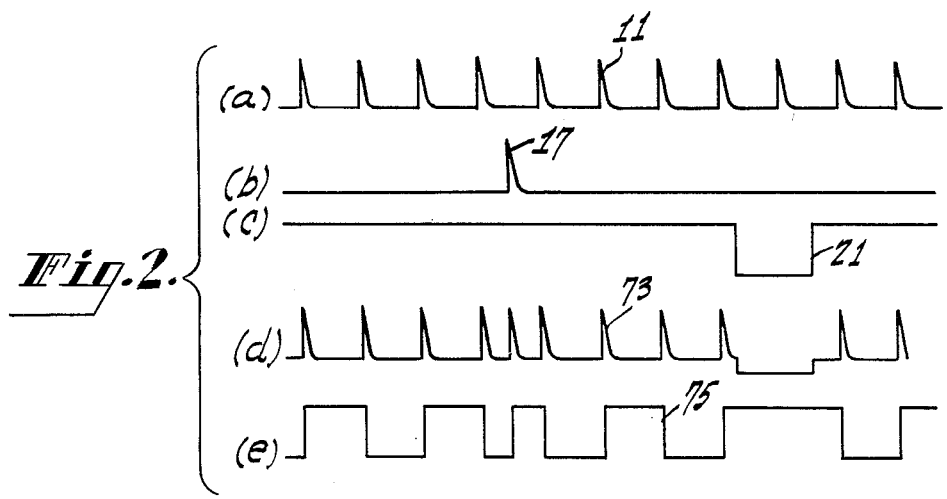

In order that the invention may be more clearly understood and readily put to practical use, a circuit arrangement embodying the invention is hereinafter described, by way of example only, with reference to the accompanying drawing in which:

Fig. 1 is a schematic diagram of phase shifting apparatus embodying the present invention; and Fig. 2, sections a through e, is a graphical representation of explanatory curves obtained with the arrangement shown in Fig. 1.

Apparatus embodying the invention is useful for shifting the phase of a timing wave generator, which may be operative to control or time equipment (not shown) such as a facsimile or printing telegraph system or the like. The controlled equipment is to operate, in the illustrative example, in synchronism with received signals.

One example of an application of the electronic phase shifter of the invention is that of a time division multiplex receiver wherein a local standard frequency wave is corrected in phase and/or frequency to be synchronous with an incoming signal wave. A frequency change in the local frequency is accomplished by additive discrete steps of phase shift. For this use, a wave source of standard frequency and a wave source of frequency shiftable in phase relative to the standard wave is required. By way of example, a standard frequency wave, available from any controlled source and therefore not shown, is 600 cycles per second. The 600 cycle standard frequency is first doubled to 1200 cycles and a train of pulses is derived in any known manner from the 1200 cycle voltage. These 1200 cycle pulses are represented by the curve 11 in Fig. 2a and are applied to a timing wave generator 10 at the reference wave input terminals 12 and 14. The output at the terminals 15 and 16 of the timing wave generator 10, which is shown as a frequency divider, is a 600 cycle wave shiftable in phase by discrete steps of 180°. This output wave after further frequency division (by means not shown) is the frequency corrected timing wave held synchronous to the input signal frequency by the proper advance and retard corrections. The advance correction is applied in the form of positive-going pulses 17 applied to the phase advancing pulse input terminals 18 and 19. The retard correction is in the form of a negative-going pulse represented by the curve 21 applied to the phase retarding pulse input terminals 23 and 24. In the illustrative example, the phase retarding pulse is shown as being derived from a "one-shot" or monostable multivibrator 25 comprising coupled tubes 26 and 27. The time duration of the phase retarding pulse is controllable by adjustment of a resistor 29. Signals or pulses for triggering the multivibrator 25 may be derived in any suitable manner and applied at the phase retarding trigger input terminals 31 and 32 to the circuit 25 through a coupling condenser 33 to the grid of the tube 26; in which case the terminals 23 and 24 are not used, of course. It is assumed with the connections shown that the tube 27 will be conducting until the multivibrator is triggered.

The timing wave generator 10 is shown, illustratively, as being in the form of a "binary counting" circuit or bistable multivibrator having two tubes 38 and 39 coupled as shown. The resistor-condenser combinations 46 and 47, one in each cross-coupling circuit, controls the switching time of the multivibrator 10 and the value of the condenser included in each combination changes the sensitivity to positive or negative pulses. It will be understood that the timing wave generator may include one or more stages intercoupled to provide a counting system of the type by now well known in the prior art. Electronic apparatus employing multivibrators similar to those shown illustratively in Fig. 1 of the drawing are discussed in an article entitled "Electronic Digital Counters" by Warren H. Bliss appearing in the April 1949 issue of Electrical Engineering. Suitable multivibrator drive circuits are also shown in U. S. Patent No. 2,478,683 granted to Warren H. Bliss on August 9, 1949.

Injection of a single properly timed pulse 17 to cause pulse advance, and insertion of a single properly timed blanking pulse 21 in a mixing circuit to cause phase retard, will now be described. A pair of mixer tubes 55 and 56, or other repeaters, have a common load resistor 61 in the cathode leads. A resistor 60 is connected between the reference wave input terminal 12 and ground to complete the anode circuit of the tube 55. A similar resistor 62 is provided for the anode of the tube 56. The control electrodes or grids are returned through series resistors 58 and 59 to a suitable source of positive potential (not shown) as indicated schematically by the legend +B. Grid current flowing through the resistor 61, the conducting grid resistance of the tubes 55 and 56 and the resistors 58 and 59, causes the grids to operate very slightly positive with respect to the cathodes. The resistor 61 is made very much smaller than the resistor 58 so that with no signal inputs, the voltage across the cathode resistor 61 is small compared to the pulse voltage which appears across the cathode output resistor 61 with signal input in the form of the input reference wave pulses. The ratio of the resistance values of the resistor 58 to resistor 59 is made such that the positive potential existing at the junction of the series resistors 58 and 59 is greater than the maximum pulse voltage applied to the anodes of the tubes 55 and 56. In this manner, the operating anode resistance of the tubes 55 and 56 is made small so that most of the pulse voltage applied to the anodes of the tubes 55 and 56 appears as output voltage across the common cathode load resistor 61. The normal reference wave input pulses 11 are applied at the terminals 12 and 14 to the tube 55 and appear across the resistor 61. The phase advancing pulse, shown by the curve 17, added to cause advance, is applied from the terminals 18 and 19 to the anode of the tube 56 and appears across the cathode resistor 61. The phase advancing pulse is timed so as to occur between two normal pulses as represented by the curve 11. In this manner, when a normal pulse occurs the cathode potential rises and the voltage at the anode of the tube 56 is negative with respect to the cathode. Similarly, when a phase advancing pulse occurs, the anode of the tube 55 is negative with respect to the cathode, hence, except for tube and stray capacities, there is no coupling between the normal input at the terminals 12, 14 and the advance input terminals 18, 19. To retard the phase of the output timing wave, both tubes 55 and 56 are rendered non-conducting, by means of a negative pulse applied to the phase retarding input terminals 23, 24 and of sufficient magnitude to cut off the tubes 55 and 56 for the pulse anode voltages involved. Normally, the retard pulse is timed so as to eliminate one of the normal pulses. Both the normal input and advance input pulses cause a rise in cathode potential and hence a change in grid current through the resistors 58 and 59. Therefore, a portion of both the normal input and the advance input pulse voltages appears across a resistor 66 connected from the terminal 23 to ground. Condensers 68 and 69 serve as coupling condensers. The portion of the input pulse voltages coupled into the retard input can be made small by making the resistance value of the resistor 66 small compared to the value of the resistors 58 and 59.

The pulse voltage appearing across the common cathode resistor 61 has a pulse added for advance, and one omitted for retard. This is the addition or omission of a full cycle and hence an advance or retard in phase of 360°.

If it is desired to obtain smaller amounts of phase shift, a frequency divider is or may be driven from the pulse output across the load resistor 61 as shown in the illustrative example. If the frequency divider has an output frequency of $f/n$ for an input frequency of $f$, the phase shift at the output is $$\frac{360°}{n}$$

For purposes of illustration a divider with $n=2$ is shown as the timing generator 10. The phase shift at the output of the divider is 180°. The voltage wave shapes are shown in Fig. 2, the voltage across the resistor output 61 is represented by the curve 73 and the output of the frequency divider being represented by the curve 75.

The invention claimed is:

1. Phase shifting apparatus comprising means to provide an input signal wave in the form of positive-going pulses, means for repeating said pulse signals, a timing wave generator, an output connection from said repeater to said timing wave generator, a second repeater, means common to said first repeater for coupling said second repeater to said timing wave generator, means for causing said second repeater to add positive going pulses to said input signal, and means including said second repeater for causing said first repeater to omit positive-going pulse from said input signal.

2. Phase shifting apparatus comprising means to provide an input signal in the form of positive-going pulses, a tube for repeating said pulse signals, a timing wave generator, an output connection from said tube to said timing wave generator, a second tube, a circuit element common to said first tube for coupling said second tube to said timing wave generator, means for causing said second tube to add positive-going pulses to said input signal, and means for causing said first and second tube to be cut off thereby to omit positive-going pulses from said input signal.

3. Phase shifting apparatus comprising means to provide an input signal in the form of positive-going pulses, means for repeating said pulse signals, a frequency divider, an output connection from said repeater to said frequency divider, a second repeater, means common to said first repeater for coupling said second repeater to said frequency divider, means for causing said second repeater to add positive-going pulses to said input signal, and means including said second repeater for causing said first repeater to omit positive-going pulses from said input signal.

4. Phase shifting apparatus comprising means to provide an input signal in the form of positive-going pulses, a tube having a cathode, an anode, and a control electrode for repeating said pulse signals, a timing wave generator, a cathode resistor for said tube, an output connection from said resistor to said timing wave generator, a second tube having a cathode, an anode, and a control electrode, said cathode resistor being common to said second tube, means for applying additional positive-going pulses to the anode of said second tube, and means for applying a negative-going signal to the control electrodes of said first and second tubes to cut off said tubes.

5. Phase shifting apparatus comprising means to provide an input signal in the form of positive-going pulses, a tube having a cathode, an anode, and a control electrode for repeating said pulse signals, a timing wave generator, a cathode resistor for said tube, a second tube having a cathode, an anode, and a control electrode, said cathode resistor being common to said second tube, means for coupling said cathode resistor to said timing wave generator, and means for applying additional positive-going pulses to the anode of said second tube.

6. Phase shifting apparatus comprising means to provide an input signal in the form of positive-going pulses, a tube having a cathode, an anode, and a control electrode for repeating said pulse signals, a timing wave generator, a cathode resistor for said tube, an output connection from said resistor to said timing wave generator, a second tube having a cathode, an anode, and a control electrode, said cathode resistor being common to said second tube, and means for applying a negative-going signal to the control electrodes of said first and second tubes to cut off said tubes.

7. Phase shifting apparatus comprising means to provide an input signal in the form of positive-going pulses, a tube having a cathode, an anode, and a control electrode for repeating said pulse signals, a timing wave generator, a cathode resistor for said tube, an output connection from said resistor to said timing wave generator, a second tube having a cathode, an anode, and a control electrode, said cathode resistor being common to said second tube, said control electrodes being connected to a source of positive potential, means for applying additional positive-going pulses to the anode of said second tube, and means for applying a negative-going signal to the control electrodes of said first and second tubes to cut off said tubes.

8. Phase shifting apparatus comprising means to provide an input signal in the form of positive-going pulses, a tube having a cathode, an anode, and a control electrode for repeating said pulse signals, a timing wave generator, a cathode resistor for said tube, a second tube having a cathode, an anode and a control electrode, said cathode resistor being common to said second tube, means for coupling said cathode resistor to said timing wave generator, said control electrodes being connected to a source of positive potential by way of another resistor, means for applying additional positive-going pulses to the anode of said second tube, and means for applying a negative-going signal to a tap on said second resistor to cut off said first and second tubes.

9. An electronic phase shifting circuit arrangement including a timing wave generator for generating a timing wave in response to an applied train of pulses having an output circuit from which said timing wave is obtained and an input circuit, a mixing circuit having input terminals to which said train of pulses is applied and output terminals directly connected to the input circuit of said timing wave generator to trigger the latter to produce said timing wave, means coupled to said mixer circuit to inject additional pulses in said train of applied pulses to advance the phase of said timing wave, and means coupled to said mixer circuit to blank some of said pulses from said train to retard the phase of said timing wave with respect to said pulse train as applied to the input terminals of said mixing circuit.

10. An electronic phase shifting circuit arrangement including a timing wave generator for generating a timing wave in response to an applied train of positive-going pulses having an output circuit from which said timing wave is obtained and an input circuit, a mixing circuit having input terminals to which said train of positive-going pulses is applied and output terminals directly connected to the input circuit of said timing wave generator to trigger the latter to produce said timing wave, means coupled to said mixer circuit to inject additional positive-going pulses in said train of applied positive-going pulses to advance the phase of said timing wave, and means coupled to said mixer circuit to blank some of said positive-going pulses from said train to retard the phase of said timing wave with respect to said pulse train as applied to the input terminals of said mixing circuit.

11. An electronic phase shifting circuit arrangement including a timing wave generator for generating a timing wave in response to an applied train of positive-going pulses having an output circuit from which said timing wave is obtained and an input circuit, a tube having a cathode, an anode, and a control electrode for repeating said positive-going pulses, a cathode resistor for said tube an output connection from said resistor to the input circuit of said timing wave generator, a second tube having a cathode, an anode, and a control electrode, said cathode resistor being common to said second tube, said control electrodes being connected to a source of positive potential, means for injecting additional positive-going pulses at the anode of said second tube to advance the phase of said timing wave, and means for applying a negative-going signal to the control electrodes of said first and second tubes to cut off said tubes to blank some of said positive-going pulses from said train to retard the phase of said timing wave with respect to said pulse train as applied to the input terminals of said mixing circuit.

12. Phase shifting apparatus comprising means to provide an input signal wave in the form of a train of unidirectional pulses, means for repeating said pulse signal wave, a timing wave generator, an output connection from said repeater to said timing wave generator, a second repeater, means common to said first repeater for coupling said second repeater to said timing wave generator, means for causing said second repeater to add unidirectional pulses to said input signal wave, and means including said second repeater for causing said first repeater to omit unidirectional pulses from said input signal wave.

13. Phase shifting apparatus comprising means to provide an input signal wave in the form of a train of unidirectional pulses, means for repeating said pulse signal wave, a frequency divider, an output connection from said repeater to said frequency divider, a second repeater, means common to said first repeater for coupling said second repeater to said frequency divider, means for causing said second repeater to inject unidirectional pulses to said input signal, and means including said second repeater for causing said first repeater to blank positive-going pulses from said input signal wave.

References Cited in the file of this patent

UNITED STATES PATENTS

| | | |
|---|---|---|
| 2,564,559 | Canfora | Aug. 14, 1951 |
| 2,617,932 | Coughlin | Nov. 11, 1952 |